March 1, 1960 — A. N. OBES — 2,926,889
RETRACTABLE LANDING GEAR FOR TRAILER BODIES
Filed March 27, 1957 — 3 Sheets-Sheet 1

Inventor
Andrew N. Obes
by Roberts Cushman & Grover
Attys

March 1, 1960 A. N. OBES 2,926,889
RETRACTABLE LANDING GEAR FOR TRAILER BODIES
Filed March 27, 1957 3 Sheets-Sheet 2
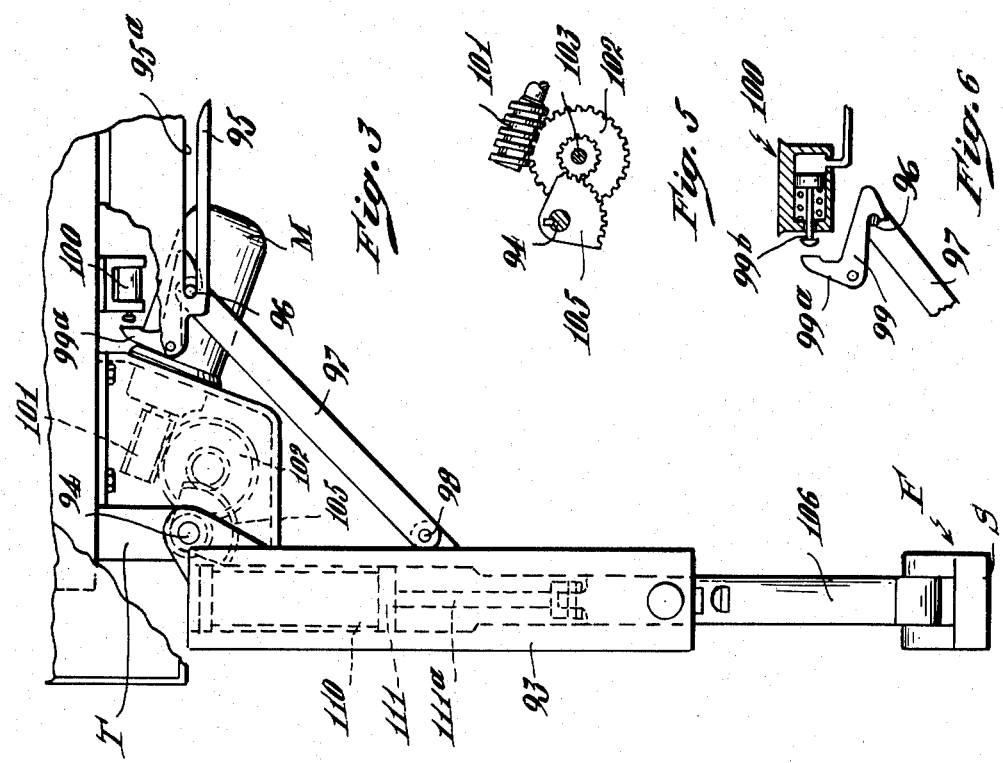
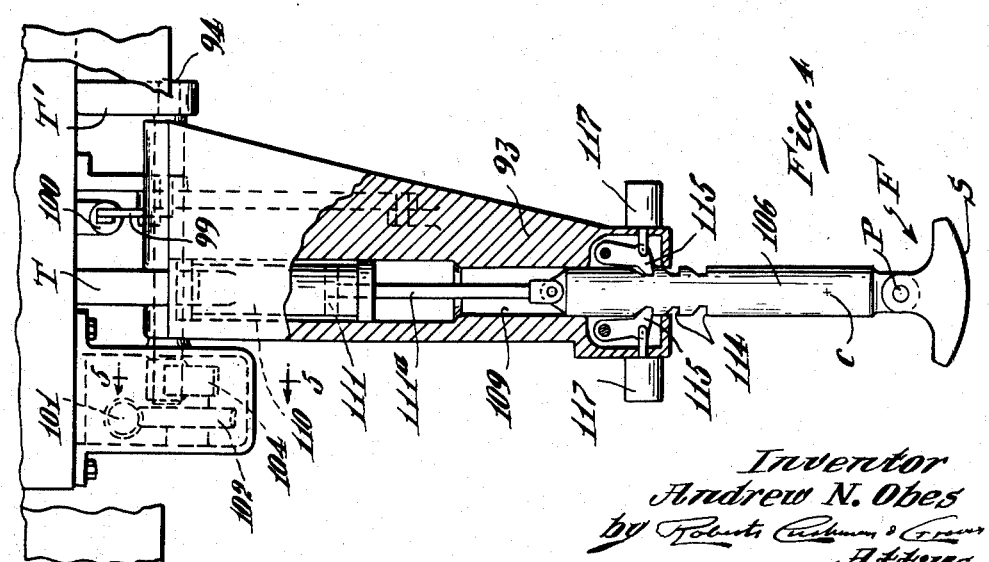
Inventor
Andrew N. Obes _United States Patent Office_

2,926,889
Patented Mar. 1, 1960

2,926,889

RETRACTABLE LANDING GEAR FOR TRAILER BODIES

Andrew N. Obes, New York, N.Y.

Application March 27, 1957, Serial No. 648,808

5 Claims. (Cl. 254—86)

This invention pertains to trailer trucks or similar vehicles and more especially to retractable landing gear for use in supporting the forward end of the trailer body while the latter is separated from the truck, the present application being a continuation-in-part of my co-pending application for Letters Patent, Serial No. 483,541 filed January 24, 1955.

Customarily, such retractable landing gear comprises some form of linkage whereby a supporting leg or strut, provided at its end with a small wheel, castor or the like may be moved from an inoperative position (usually just beneath the trailer body) to an operative position where the wheel contacts the ground, or vice versa. Usually the shift of this leg or strut from from one of said positions to the other is brought about by the manual actuation of a crank, wheel or lever.

Since the available space beneath the trailer body for the storage of the landing gear (when the latter is not in use) is limited, difficulty has been experienced in designing landing gear capable of being folded into the available space but which, when extended, is of adequate length and strength to support the end of the trailer body at the desired elevation above the ground. Moreover, since the ground may not be level at the place where the supporting wheel may rest, there is the danger that the wheel may roll and permit the trailer to shift its position.

Objects of the present invention are to provide retractable landing gear, comprising power actuated means for shifting the leg or strut from operative to inoperative position or vice versa; to provide retractable landing gear of a design such that the leg or strut may be folded into a relatively small space, but which when extended, has all of the requisite strength to support the trailer even when fully loaded and at the desired height from the ground, and having locking means to prevent the leg or strut from collapsing by accident. A further object is to provide retractable landing gear wherein the ground-contacting element is so devised as to engage the ground without danger of slipping or rolling, even though the ground be sloping. Other and further objects of the invention will be pointed out in the following more detailed description and by reference to the accompanying drawings wherein:

Fig. 3 is a fragmentary elevation, partly in vertical section on the line 3—3 of Fig. 1 and to larger scale than Fig. 2, showing the left-hand unit of the landing gear, said unit being in operative position, certain of the interior parts being shown in dotted lines;

Fig. 4 is an elevation, looking from the right-hand side of Fig. 3 and partly in vertical section, showing interior details;

Fig. 5 is a fragmentary detail view on the line 5—5 of Fig. 4 (omitting supporting parts and the enclosing casing) showing gearing employed in moving the supporting strut from operative to inoperative position and vice versa;

Fig. 6 is a fragmentary elevation, partly in section, showing one of the locking latches and the means for actuating it;

Figure 1:
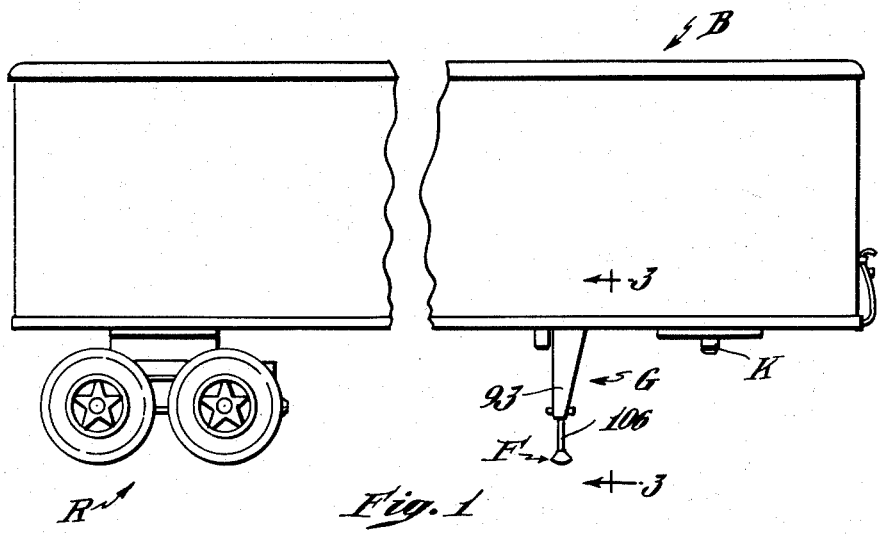
Fig. 1 is a fragmentary, diagrammatic side elevation of a trailer body having its rear end mounted on wheels, and having its forward end supported by retractable landing gear embodying the present invention.

Referring to the drawings the trailer body B is shown as supported at its rear end upon the conventional highway wheels R, and at its forward end upon retractable landing gear G embodying the invention. The forward part of the trailer body is shown as having a downwardly directed kingpin K designed to engage a suitable socket in a tractor (not shown) by means of which the trailer body may be drawn along the highway after the landing gear has been folded.

Figure 2:
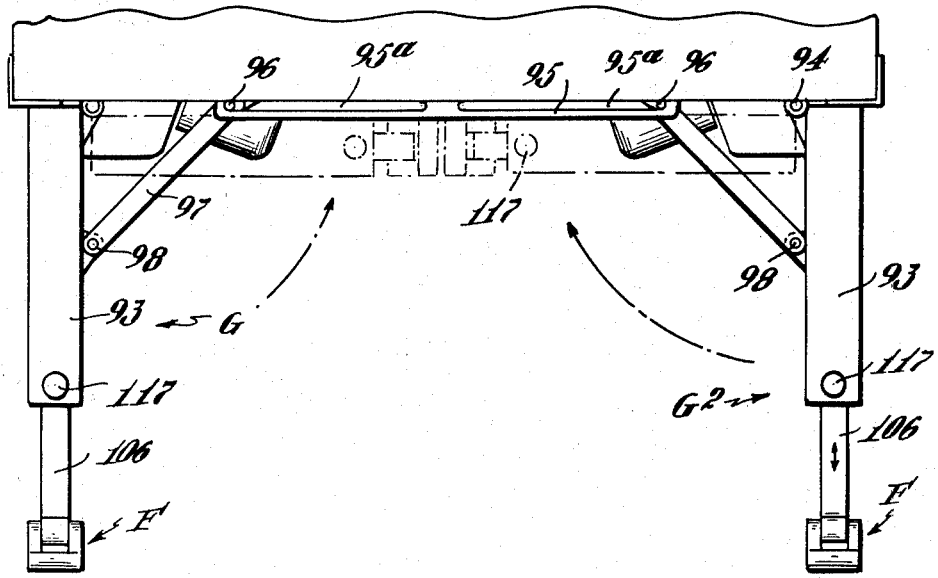
Fig. 2 is a fragmentary front elevation of the trailer body shown in Fig. 1 but to larger scale and omitting certain parts, the folded position of the supporting legs or struts being shown in broken lines.

The landing gear, according to the present invention comprises duplicate units G and G2 (Fig. 2) located at opposite sides respectively of the trailer body. Since these units are duplicates it is necessary to describe but one of them in detail. Thus, as shown more particularly in Figs. 3 to 6, each landing gear unit comprises rigid leg or strut 93, here shown as a casting which, when in operative position, is vertical. Each strut is keyed or otherwise fixedly secured, at its upper end, to a horizontal shaft 94 whose axis extends longitudinally of the trailer body. Each shaft 94 turns in bearings in brackets T and T' (Fig. 4) which project downwardly from the underside of the trailer body. The struts are thus capable of swinging transversely of the trailer body. In accordance with the present invention, each strut proper is of a length less than one-half the width of the trailer body so that the struts 93, althuogh directly opposite to each other, may be folded up into the inoperative horizontal position (shown in broken lines in Fig. 2) without interference.

An elongate, rigid guide member 95 (Figs. 2 and 3) fixed to the underside of the trailer body has elongate slots 95ª, each designed to receive a pin 96 (one pin for each of the respective units G or G2) and to guide the pins to move horizontally. Each pin 96 is fixed to the upper end of a rigid, elongate brace 97 which is pivotally connected at 98, near its lower end, to the corresponding strut 93 at a point about midway the length of the latter. A latch 99 (Figs. 3, 4 and 6) is arranged to engage the pin 96, at times, and, thereby to lock the brace 97 and thus positively to hold the strut in the operative position shown in Figs. 2 and 3. This latch 99 has an actuating arm 99ª (Fig. 6) which is engageable, at times, by a plunger 99b which slides in a cylinder 100. A spring normally holds the plunger in retracted position. When this plunger is projected by the admission of pressure fluid, for example compressed air, to the inner end of the cylinder 100, the latch 99 is thereby swung so as to release the pin 96, thus allowing the brace to move and the strut 93 to be folded up toward the horizontal position indicated in broken lines in Fig. 2 about the axis of shaft 94.

For moving the strut, either upwardly or downwardly, there is provided suitable gearing, (Fig. 5) including a worm 101 driven by a reversible electric motor M. The worm drives a worm wheel 102 fixed to a shaft 103 to which a pinion 104 is secured. This pinion meshes with a segmental gear 105 keyed to the shaft 94 to which the strut 93 is fixed. Thus, when the motor is actuated, the shaft 94 is turned in one direction or the other to swing the strut from or to operative position, respectively. The worm gearing prevents accidental reversal of the motion of the shaft 94, thus avoiding the possibility that the strut will fold unintentionally.

Figure 8:
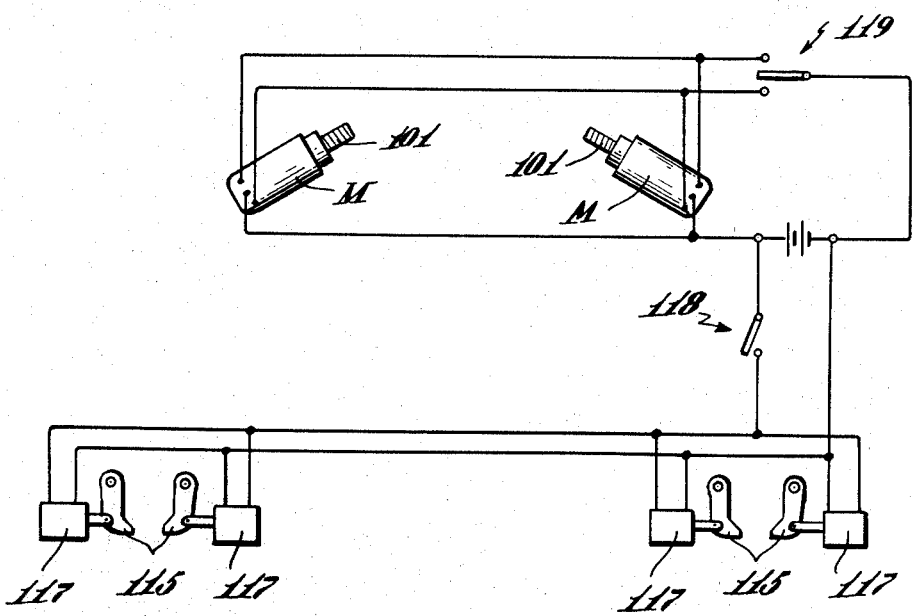
Fig. 8 is an electrical diagram indicating how some of the parts are actuated and controlled.

As above noted the struts 93 are of a length such that, although they are directly opposite to each other, they may be folded up to lie substantially parallel to the trailer body, where they are in axial alignment. Struts of this length are not sufficient, ordinarily, to support the trailer body at the proper height from the ground. In order to provide landing gear which will hold the trailer body at the desired height, each strut 93 is provided (Fig. 4) with a plunger-like extension member 106 arranged to slide within a cylindrical bore 109 formed within the strut 93. The upper part of this bore is enlarged to house a cylinder 110 containing a piston 111 which has a rod 111ª pivotally connected to the upper end of the plunger 106. When pressure fluid, for instance compressed air, is supplied to the upper end of the air cylinder 110, the piston is pushed down, thus pushing the plunger 106 downwardly to an amount dependent upon the amount of fluid admitted to the cylinder. By admitting pressure fluid to the lower end of the cylinder 110 the plunger 106 may be retracted. The plunger 106 is provided at its opposite sides with rack teeth 114. The strut 93 carries pivoted pawls 115 designed to engage these rack teeth 114 and thus positively to hold the plunger or extension 106 in the desired projected position. For releasing these pawls from the rack teeth, solenoids 117 are provided, and these solenoids are supplied with current from a suitable source within the trailer. The current is supplied simultaneously to the pawls 115 of both landing gear units by the operation of a single switch 118 (Fig. 8).

Each plunger or extension member 106 is preferably provided at its lower end with a foot or skid F which is pivotally connected to the plunger by a pivot pin P and which, as shown, preferably has a convex arcuate ground contacting surface S. It will be noted that the center of curvature C of the surface S is spaced a substantial distance above the center of pin P so that the foot does not act as a roller but merely as a rocker. With this arrangement, when foot F first contacts the ground, it automatically rocks into a position such as to provide a firm support, but since the pivot pin P is not at the center of curvature of the surface S there is no danger that the foot will roll and thus allow the truck body to shift its position.

Figure 7:
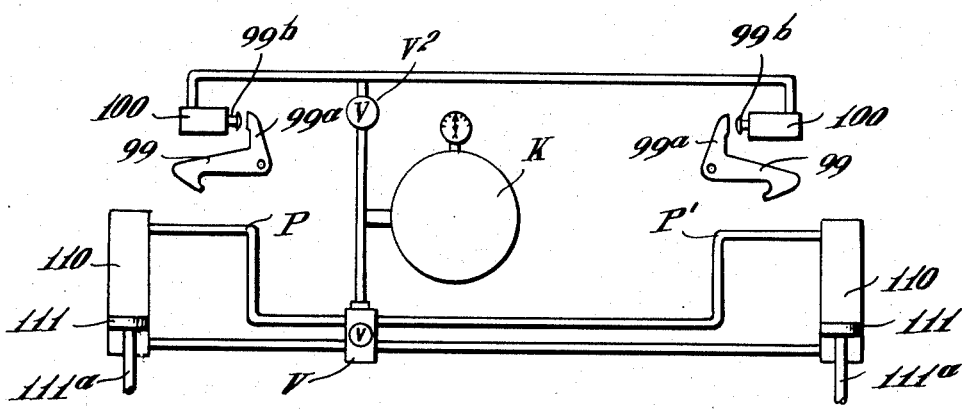
Fig. 7 is a diagram indicating fluid actuated means whereby certain elements of the landing gear are actuatable.

When the forward end of the trailer body is to be supported by the landing gear, the reversible motors M are first energized by closing the switch 119 in the proper direction to insure the desired direction of rotation of the motor shafts. The shafts 94 turn in opposite directions so as to swing the struts 93 simultaneously down to the vertical position shown in Figs. 3 and 4. As the struts thus swing down, the pins 96 travel along the guide slots 95ª and as the struts arrive at vertical position, the pins 96 are engaged and locked by the latches 99, thus positively holding the struts in operative position. Pressure fluid is now supplied simultaneously to the upper ends of cylinders 110 by actuating the three-way valve V (Fig. 7) to admit compressed air from tank K to the pipes P and P', thus projecting the plungers 106 downwardly until the feet F contact the ground. The pawls 115 automatically lock the plungers in their projected positions.

When it is desired to fold the landing gear to inoperative position, the switch 118 is closed, thereby simultaneously energizing all of the solenoids 117 so as to release the pawls 115 from plungers 106. The valve V is now reversed to release air from the upper ends of cylinders 110 and to admit it to the lower ends of the cylinders, thus moving pistons 111 up and so retracting the plungers 106.

Valve V2 (Fig. 7) is now actuated to admit compressed air to the closed ends of the cylinders 100 thereby projecting plungers 99ᵇ so as to rock lower arms 99ª and so disengage latches 99 from pins 96. Thereupon switch 119 is set as to supply current to reversible motors M to cause their shifts to turn in the proper directions to swing struts 93 up to the inoperative or broken line portions of Fig. 2. The current is then cut off from the motors, and the worm gearing is sufficient, without additional locking means, to hold the landing gear in folded, inoperative position.

While one desirable embodiment of the invention has herein been disclosed by way of example it is to be understood that all such modifications and substitutions as fall within the appended claims are to be regarded as within the purview of the invention.

I claim:

1. In combination with a trailer body, landing gear for temporarily supporting an end of said body, said landing gear comprising two rigid struts pivotally attached to the trailer body adjacent to opposite sides respectively of the latter so as to swing transversely of the trailer body about parallel axes, means including reversible electric motors operative simultaneously to swing both struts from inoperative to operative position or vice versa, the means for swinging each strut comprising a worm and worm gear thereby to prevent accidental reverse motion of the struts, each respective strut being of a length less than one-half the width of the trailer body, each strut proper having an adjustable extension element movable longitudinally of the strut proper, a reversible hydraulic motor for extending or retracting each respective extension element, means operative automatically to hold each extension element in projected position relatively to the strut proper thereby to provide a support of a total effective length exceeding that of the strut proper, the means for holding the extensions in projected position comprising locking elements and means operative simultaneously to release the locking elements thereby to permit the extension elements to be retracted.

2. In combination with a trailer body, landing gear for temporarily supporting an end of said body, said landing gear comprising two rigid struts pivotally attached to the trailer body adjacent to opposite sides respectively of the latter so as to swing transversely of the trailer body about parallel axes, reversible motor means for swinging each strut from operative to inoperative position and vice versa, each respective strut being of a length insufficient to hold the trailer body at the desired elevation, and each strut having an adjustable extension element movable longitudinally of the strut proper, motor means operative simultaneously to project said extension elements, thereby to provide a support of a total effective length exceeding that of the strut proper, means for automatically locking the extension elements in projected position, and means operative simultaneously to release said locking means, thereby to permit the extension elements to be retracted, the means for holding the extension elements in projected position comprising rack teeth carried by each extension element and pawls engageable with the rack teeth thereby to hold the extension elements in projected position, a solenoid operative to retract each respective pawl from engagement with the rack teeth, and means operative simultaneously to energize the several solenoids.

3. In combination with a trailer body, landing gear for temporarily supporting an end of the trailer body, said landing gear comprising two rigid struts pivotally attached to the trailer body adjacent to opposite sides respectively of the latter so as to swing transversely of the trailer body about parallel axes, each respective strut being of a length less than one-half the width of the trailer body, motor means for swinging the struts toward and from operative position, each strut having a longitudinally extending guide bore, an elongate plunger movable longitudinally of said guide bore, a cylinder carried by each strut, a piston in each cylinder, means connecting each piston to a corresponding plunger, means for admitting pressure fluid to each cylinder, thereby to move the plunger, and means for controlling the simultaneous admission and release of pressure fluid to and from the respective cylinders, and retaining means operative automatically to prevent retraction of the plunger when it has been projected to the desired extent.

4. In combination with a trailer body, landing gear for temporarily supporting an end of said body, said landing gear comprising two rigid struts pivotally attached to the trailer body adjacent to opposite sides respectively of the latter so as to swing transversely of the trailer body about parallel axes, a rigid brace pivotally attached at its lower end to each of said struts respectively, an elongate, horizontal guide fixed to the trailer body, a follower element fixed to the upper end of each respective brace and which engages and moves along said guide, means for retaining said follower elements in adjusted position along the guide, thereby to hold the struts in operative position, the follower element which moves along the guide being a pin fixed rigidly to the respective brace, latches operative to engage and hold said pins at the corresponding outer ends of the guideways and means operative to release the latches from the pins thereby to allow the struts to be folded, the means for releasing the latches from the pins including a cylinder associated with each latch and a fluid-actuated plunger within each cylinder.

5. In combination with a trailer body, landing gear for temporarily supporting an end of said body, said landing gear comprising two independent rigid struts, each pivotally attached to the trailer body adjacent to opposite sides respectively of the latter so as to swing in opposite directions transversely of the trailer body about parallel axes, a brace pivotally attached at one end to each of the respective struts, a reversible motor for each respective strut operative to swing its strut to and from operative position, thereby tending to move the other end of the respective brace relatively to the trailer body, locking means operative to lock the last named end of each respective brace in operative position, motor means for releasing said locking means, each strut having an extension guided to move longitudinally of the respective strut, a reversible motor for each respective extension operative to move the extension thereby to vary the effective length of the strut, locking means for locking each extension in extended position, motor means operative simultaneously to actuate the extension locking means of both struts, each extension having a foot pivotally attached to its lower end, each foot having an arcuate ground contacting surface whose center of curvature is spaced above the axis about which the foot rocks.

References Cited in the file of this patent

UNITED STATES PATENTS

| | | |
|---|---|---|
| Re. 17,851 | Moore | Oct. 28, 1930 |
| 2,016,468 | Wagner | Oct. 8, 1935 |
| 2,142,216 | Seyferth | Jan. 3, 1939 |
| 2,345,789 | Brooks | Apr. 4, 1944 |
| 2,372,705 | Bicker | Apr. 3, 1945 |

FOREIGN PATENTS

| | | |
|---|---|---|
| 511,924 | Belgium | June 30, 1952 |
| 204,857 | Australia | Dec. 14, 1956 |